United States Patent Office 3,105,822
Patented Oct. 1, 1963

3,105,822
INHIBITED ALKALINE DETERGENT SOLUTION
Joseph V. Karabinos and Edwin J. Quinn, both of Joliet, Ill., assignors to Olin Mathieson Chemical Corporation, a corporation of Virginia
No Drawing. Filed Mar. 1, 1956, Ser. No. 568,704
7 Claims. (Cl. 252—156)

This invention provides a new composition of matter which has, from the standpoint of cost and effectiveness, outstanding utility as a sequestering agent for the polyvalent metals, particularly calcium and magnesium, in alkaline solutions, and includes compositions in which the new material is incorporated in alkaline solutions and processes in which advantage is taken of its exceptional sequestration properties to effect improvements and economies in operations involving the use of alkaline solutions where the deposition of precipitates is encountered.

In many washing operations, strongly alkaline solutions are used. In particular, in the washing of bottles in the dairy, soft drink and brewing industries, bottles are washed with the use of hot solutions of sodium hydroxide, caustic soda, approximating 3% in strength. As the water used in washing is ordinary tap or well water, containing calcium and magnesium in the amounts present in ordinary water supplies, there is a tendency for precipitates to deposit on both the wash machinery and the bottles, or the like, being washed. This deposition (milkstone) apparently takes place to the greatest extent in the first rinse tank, where, in customary operation, the pH of the rinse water is about 11.5, sometimes a little below 11.5, more often between 11.5 and 12. Precipitation results in the formation of scale on the machinery, plugging of the spray nozzles and discoloration of the bottles or other objects being washed.

Many sequestering agents, such as the glassy phosphates and tripolyphosphate, which are useful in inhibiting the formation of films or precipitates with less alkaline detergents, as, for example, those used in domestic or commercial dishwashers, are ineffective with these more highly alkaline solutions, presumably because of hydrolysis. Sodium gluconate, in amounts ranging around 2% of the amount of caustic used, has been widely used as a sequestering agent to inhibit formation or deposition of precipitates in these highly alkaline washing operations. It is reasonably effective for this purpose, but its cost is high.

The new compositions of the invention are the mixed heptonic acids derived by the cyanide carboxylation of invert sugar. The carboxylation of certain sugars, as, for example, glucose, fructose, arabinose, mannose, etc., is well known. Indeed, glucoheptonic acid derived by treatment of glucose with cyanide has been suggested, and to some extent used, as a sequestering agent. So far as we are aware, no one has previously suggested the production of a mixture of heptonic acids, specifically, a mixture which includes alpha and beta glucoheptonic acid and alpha and beta fructoheptonic acid, by the cyanide carboxylation of invert sugar.

We have discovered that this relatively inexpensive mixture of heptonic acids is surprisingly effective as a sequestering agent in highly alkaline solutions, in particular, in the 3.0±% caustic solutions used in bottle washing, over the entire range of hardness encountered in washing operations, that is, with water having a hardness below 15 grain as well as harder waters, e.g., 35 grain or higher. We have noted that the effectiveness of this mixture is suppressing formation of deposits is particularly striking where the rinse water in the first rinse is in the higher pH range of 11.5 to 12 normally encountered in washing operations, is hot and is at the point of incipient turbidity, as it ordinarily is in actual practice.

For evaluation of the sequestering capacity of the new compositions of this invention, as compared with gluconic acid and glucoheptonic acid, we have used a test method which represents a modification of a previously described test method, the modification giving a method which in our opinion more closely approximates actual service conditions than does the test method previously described. In our method a 10 foot length of steel chain weighing approximately 100 grams is circulated through 2 liters of tap water containing 60 grams of sodium hydroxide and 10 grams of sequestering agent under test maintained at 150° F. followed by passage through a 3 liter bath of rinse tap water at 120° F. and back to the caustic solution with one revolution of the chain being made in approximately 2 minutes. Fresh tap water (250 p.p.m. hardness) is added to the rinse water at a continuous rate causing overflow so the pH remains essentially constant at about the pH commonly encountered in the first rinse tanks of commercial machines. In one test series we maintained the rinse bath at a pH between 11 and 11.5, and in another test series between 11.5 and 12, the latter most closely approximating the pH in the first rinse tank of commercial machines which we have observed, which is where we believe the greatest deposition of "milkstone" takes place. We have also noted that as the chain is used in successive tests, with intermediate rinses in dilute HCl to remove deposits, it loses its original smooth surface and tends to absorb more deposit. In our tests reported below, we used a chain or chains which had been subjected to several such treatments so that the factor of variability of chain surface is eliminated.

In the tests reported below, we used a 6 hour running period. The results are tabulated below.

|  | Wt. of Scale in Grams | |
| --- | --- | --- |
|  | Rinse pH 11–11.5 | Rinse pH 11.5–12 |
| Blank | 0.2808 | 0.4759 |
| Sodium Gluconate | 0.1017 | 0.1752 |
| Sodium α-glucoheptonate | 0.2059 | 0.0933 |
| Sodium α- and β-glucoheptonates (prepared by adding NaCN to glucose with no NH₄Cl) | 0.1321 | 0.1885 |
| Sodium α- and β-glucoheptonates (prepared by adding NaCN to glucose with NH₄Cl) | 0.0801 | 0.1325 |
| Sodium α- and β-fructoheptonates (prepared by adding NaCN to fructose without NH₄Cl) | 0.1313 | 0.0759 |
| Sodium α- and β-fructoheptonates (prepared by adding NaCN to fructose with NH₄Cl) | 0.0938 | 0.0534 |
| Invert heptonates (NaCN + invert sugar without NH₄Cl) | 0.1083 | 0.0557 |
| Invert heptonates (NaCN + invert sugar with NH₄Cl) | 0.0911 | 0.0470 |

From the foregoing tests it is apparent that with sodium gluconate and sodium glucoheptonate the deposition of scale increases with increase of pH of the rinse water, whereas with the heptonates prepared from invert sugar by cyanide carboxylation, the deposition decreases. It is also apparent that the mixture of heptonic acids from invert sugar gives less scale formation than could be predicted on the basis of that obtained with glucoheptonates or fructoheptonates separately. The fructoheptonates are superior to the glucoheptonates under the more alkaline conditions, but the invert heptonates are superior even to the fructoheptonates. We have no explanation for this observed phenomenon.

Likewise it will be noted that the heptonates prepared from either glucose or fructose or invert sugar with the use of sodium cyanide under alkaline conditions are less effective than those prepared with the use of sodium cyanide along with ammonium chloride, that is, under acid conditions. It is thought that addition of ammonium chloride or some other acidic reagent to the reaction mixture of a sugar such as glucose and cyanide, or the use of hydrogen cyanide instead of sodium cyanide, tends to increase the proportion of alpha epimer formed, at least in the case of glucose. With fructose there is no information as to which of the two epimers, the alpha or the beta, is formed in greater proportions with such modification of the reaction conditions, but the observable fact is that a more effective sequestering agent is obtained. Exactly what the influence of the use of ammonium chloride or other acid reagent in the reaction mixture with invert sugar on the relative proportions of the epimers formed may be is not known to us. Presumably with the glucose half the tendency is to increase the production of alpha glucoheptonic acid and it may be that the same thing happens in respect of the formation of alpha fructoheptonic acid.

The preparation of the mixture of heptonic acids from invert sugar is simple. Advantageously, sodium cyanide is used, and, in that case, all that is involved is adding sodium cyanide, with particular advantage together with ammonium chloride, to a solution of invert sugar, as, for example, an ammonia neutralized solution resulting from the hydrochloric acid hydrolysis of sucrose, maintaining the solution at a temperature of 18 to 20° C. or lower for several hours and then completing the reaction by heating to 60° C. for one or two hours, followed by heating to 95 to 100° C. or aerating at about 60° C. for several hours to convert all of the cyanides or other nitrogen-containing products to the carboxylate and to expel the ammonia. The product so obtained is the sodium salt of the invert sugar heptonic acids. It is conveniently used as a 50% solution in water. Of course, whether the product be used as the sodium salt, or the salt with some other cation, or whether it be converted to the free acid, when used as a sequestering agent in alkaline solutions the acids are essentially present as the ionized salt of whatever alkali metal is present in the solution, customarily sodium.

The preparation of these invert sugar heptonic acids will be illustrated by the following example:

Example

A 50% solution of sucrose in 0.1 N hydrochloric acid is heated at 70° C. for 35 minutes, at which time inversion to a mixture consisting of a solution of glucose and fructose in equal proportions is essentially complete. 69 parts by weight of sucrose gives 72.6 parts by weight of glucose and fructose. The invert sugar solution made from 69 parts by weight of sucrose and 59 parts by weight of water is cooled to 18 to 20° C. (tap water temperature) and neutralized with ammonium hydroxide to a pH of 8. 20 parts by weight of solid ammonium chloride are added followed by 19.8 parts by weight of technical sodium cyanide (96%) with tap water cooling continued for several hours. The mixture is then allowed to stand at room temperature overnight at which time the reaction is 80 to 90% complete. It is completed by heating to 60° C. for one to two hours. The reaction mixture is then heated to 95 to 100° C. for several hours to convert all of the organic nitrogen-containing products to the carboxylate and expel the ammonia. The volume of the product is adjusted with water to give a solution of the sodium invert sugar heptonates containing 50 grams of heptonate in each 100 grams of solution, a convenient form in which to distribute and use the product.

Substantially the same technique, with omission of the use of ammonium chloride, also gives sodium invert sugar heptonates, but this mixture, while an effective sequestering agent in alkaline media, is not as effective as the product obtained with the use of the ammonium chloride. Instead of using sodium cyanide, hydrogen cyanide or potassium cyanide may be used, although for obvious reasons the use of sodium cyanide is the procedure of choice. Hydrogen cyanide used alone gives a product similar to that obtained with sodium cyanide and ammonium chloride. Other acidic agents may be used with sodium or potassium cyanide, in place of the ammonium chloride, to give similar products, although their use is less advantageous because they leave residual materials in the product.

In the comparative tests outlined above, the water used contained about 250 parts per million of hardness. Tests carried out in the same way, but using 35 grain water gave, with the caustic alone, a 127 mg. deposit in one hour and 188 mg. deposit in 4 hours; with 2 grams of sodium gluconate added to the 2 liters of 3% caustic solution, 24 mg. in one hour and 82 mg. in 4 hours; with 10 grams of sodium gluconate added to the 2 liters of 3% caustic solution, 18 mg. in one hour and 74 in 4 hours; with 2 grams of invert sugar heptonates added to the 2 liters of 3% caustic solution, 29 mg. in one hour and 32 mg. in 4 hours; and with 10 grams of invert sugar heptonates added to the 2 liters of 3% caustic solution, 10 mg. in one hour and 38 mg. in 4 hours. In this series of tests the invert sugar heptonates used were prepared as in the example above with the use of ammonium chloride in the carboxylation reaction. The pH of the rinse water in this series of tests was from 11.5 to 12, corresponding to common practice in the bottle washing industry.

The proportion of the invert sugar heptonate to be used, for optimum suppression of scale or other adherent deposit, will vary with the hardness of the water, the temperature, caustic concentration, etc., but in general the amount used will be between 0.5 and 10%, based on the caustic alkali—2% is a good, average amount.

The invert sugar heptonates, prepared in accordance with the example above including the use of ammonium chloride, were tested on a full scale bottle washing machine in a dairy using city water of 250 p.p.m. hardness. The bottle washing machine used was a Continental Model S Standard 12 Wide. The capacity of the machine was 1820 gallons of water. The machine had been operated using 2 gallons of 50% sodium gluconate solution with the charge plus 4 ounces per day. The machine was rinsed and cleaned of deposits and prepared for the test run. One area on the wash spray header was scraped clean. The 3 caps on the spray tubes of the first rinse were removed and cleaned and the screen on the first rinse tank was cleaned and replaced. As an initial charge 1800 gallons of water (250 p.p.m.), 400 lbs. of caustic soda and 2 gallons of a 50% solution of the sodium invert sugar heptonates were added. Over a period of 8 weeks the washer was used for 40 actual washing days. Each day at the end of the washing period 100 ml. of the sodium invert sugar heptonates was added together with make-up water and caustic as required. Over 333,000 milk bottles of 4 sizes were washed in this period. No instance of clogging of the spray jets was reported in this period, although such clogging had previously been a major problem. The spray pipes and screens did not become heavily coated and while some deposition occurred on the wash spray header it was not as heavy as had been previously encountered with the sodium gluconate solution and it did not form as quickly. The bottles washed had a cleaner and more shiny appearance than those washed in accordance with previous practice. The operators reported the operation more satisfactory than with the additive (sodium gluconate) previously used.

A subsequent test on another full scale dairy bottle washing operation, in which the water used was shallow well water of 35 grain hardness washing 7000 one-gallon bottles per day with 3% caustic soda solution and 2% sodium invert sugar heptonate, based on the caustic, indicated similarly good results with water of this hardness, confirming the laboratory test on 35 grain water discussed above.

The invert sugar heptonates were also tested on a full scale bottle washing machine in a brewery, in which, without the use of a sequestering agent, water-spotting caused considerable difficulty, probably as a consequence of formation of aluminum oxide from the aluminum labels on the beer bottles. Thus, operating with 200 lbs. of caustic in a 500 gallon washer using 7 grain water (about 5% concentration) 65,000 quart bottles, washed daily, resulted in about 2000 or more rejects because of water spotting. When 10 lbs. of the sodium invert sugar heptonates were incorporated in the wash solution less than 50 rejects resulted, with no other changes in the washing operation.

We claim:

1. A washing solution comprising water, caustic soda as a detergent, and from about 0.5 to about 10%, based on the caustic soda, of the mixture of heptonic acids resulting from the cyanide carboxylation of invert sugar.

2. A washing solution comprising water, caustic soda as a detergent, and from about 0.5 to about 10%, based on the caustic soda, of the mixture of heptonic acids resulting from the cyanide carboxylation of invert sugar under acidic conditions.

3. A washing solution comprising water, caustic soda as a detergent, and from about 0.5 to about 10%, based on the caustic soda, of the mixture of heptonic acids resulting from the cyanide carboxylation of invert sugar in contact with ammonium chloride.

4. An aqueous alkaline detergent solution consisting essentially of 3% by weight NaOH, 5–10% by weight based on the NaOH of the mixture of heptonic acids resulting from the cyanide carboxylation of invert sugar and the balance water.

5. In the washing of articles with water containing dissolved calcium and magnesium salts with caustic alkali solutions, the method of inhibiting the formation of films and precipitates on the articles being washed which comprises incorporating into the wash solution in at least an amount sufficient to inhibit formation of said films and precipitates, the mixture of heptonic acids resulting from the cyanide carboxylation of invert sugar.

6. In the washing of articles with water containing dissolved calcium and magnesium salts with caustic alkali solutions, the method of inhibiting the formation of films and precipitates on the articles being washed which comprises incorporating into the wash solution in at least an amount sufficient to inhibit formation of said films and precipitates, the mixture of heptonic acids resulting from the cyanide carboxylation of invert sugar under acidic conditions.

7. In the washing of articles with water containing dissolved calcium and magnesium salts with caustic alkali solutions, the method of inhibiting the formation of films and precipitates on the articles being washed which comprises incorporating into the wash solution in at least an amount sufficient to inhibit formation of said films and precipitates, the mixture of heptonic acids resulting from the cyanide carboxylation of invert sugar in contact with ammonium chloride.

References Cited in the file of this patent

UNITED STATES PATENTS

| | | |
|---|---|---|
| 694,658 | Meurant | Mar. 4, 1902 |
| 2,441,729 | Steiner | May 18, 1948 |
| 2,615,846 | Dvorkovitz et al. | Oct. 28, 1952 |
| 2,650,875 | Dvorkovitz et al. | Sept. 1, 1953 |
| 2,653,861 | Meyer | Sept. 29, 1953 |
| 2,735,866 | Clevenot | Feb. 21, 1956 |

FOREIGN PATENTS

| | | |
|---|---|---|
| 472,260 | Canada | Mar. 20, 1951 |

OTHER REFERENCES

Organic Chemistry by Fieser et al., 3rd ed. pp. 350, 351, pub. by Reinhold Pub. Corp. N. Y. (1956).

Organic Synthesis by Migrdichian (2), vol. 1, pp. 146, 147, 187, pub. by Reinhold Pub. Corp., N. Y. (1957).